US012566675B2

(12) United States Patent
Jenkins et al.

(10) Patent No.: US 12,566,675 B2
(45) Date of Patent: Mar. 3, 2026

(54) MITIGATING DATA LOSS BY VERIFYING RECOVERY LOGS

(71) Applicant: Dell Products L.P., Round Rock, TX (US)

(72) Inventors: Fani A. Jenkins, Boulder, CO (US); Srisailendra Yallapragada, Cupertino, CA (US); Uday Kiran Jonnala, San Ramon, CA (US)

(73) Assignee: Dell Products L.P., Round Rock, TX (US)

( * ) Notice: Subject to any disclaimer, the term of this patent is extended or adjusted under 35 U.S.C. 154(b) by 86 days.

(21) Appl. No.: 18/646,223

(22) Filed: Apr. 25, 2024

(65) Prior Publication Data

US 2025/0335309 A1 Oct. 30, 2025

(51) Int. Cl.
| | |
|---|---|
| *G06F 11/00* | (2006.01) |
| *G06F 11/10* | (2006.01) |
| *G06F 11/14* | (2006.01) |
| *G06F 11/1446* | (2026.01) |

(52) U.S. Cl.
CPC ...... *G06F 11/1464* (2013.01); *G06F 11/1004* (2013.01); *G06F 11/1435* (2013.01)

(58) Field of Classification Search
CPC ............. G06F 11/1464; G06F 11/1004; G06F 11/1435; G06F 11/0727; G06F 11/1458; G06F 11/1471
See application file for complete search history.

(56) References Cited

U.S. PATENT DOCUMENTS

| | | | | |
|---|---|---|---|---|
| 7,707,184 | B1* | 4/2010 | Zhang ................. | G06F 11/1471 707/648 |
| 2017/0255666 | A1* | 9/2017 | Rueger ................... | G06F 11/14 |
| 2019/0146884 | A1* | 5/2019 | Gangadharappa .. | G06F 11/2094 711/162 |
| 2021/0056000 | A1* | 2/2021 | Rostagni ............. | G06F 11/0793 |

* cited by examiner

*Primary Examiner* — Joseph D Manoskey
(74) *Attorney, Agent, or Firm* — Chamberlain, Hrdlicka, White, Williams & Aughtry; Aly Z. Dossa

(57) ABSTRACT

Techniques described herein relate to a method for managing recovery logs. The method includes obtaining, by a validation manager of a backup storage, a first snapshot comprising a first plurality of data units; making a first determination that the snapshot is associated with synchronous validation; in response to the first determination: writing a first data unit of the plurality of data units to a recovery log; computing a new checksum associated with the first data unit; comparing the new checksum with a previously generated checksum associated with the first data unit; making a second determination that the new checksum and the previously generated checksum match; and in response to the second determination: generating a backup using the plurality of data units.

18 Claims, 7 Drawing Sheets

MITIGATING DATA LOSS BY VERIFYING RECOVERY LOGS

BACKGROUND

Computing devices may provide services for users. To provide the services, the computing devices generate data. The data may be important to users of the computing devices. The data may be backed up and stored on other computing devices. The backups may be used to recover lost or corrupt data on the original computing devices. The backups may become corrupt when being written and stored to the computing devices.

SUMMARY

In general, in one aspect, the embodiments disclosed herein relate to a method performed to validate recovery logs. The method includes obtaining, by a validation manager of a backup storage, a first snapshot comprising a first plurality of data units; making a first determination that the snapshot is associated with synchronous validation; in response to the first determination: writing a first data unit of the plurality of data units to a recovery log; computing a new checksum associated with the first data unit; comparing the new checksum with a previously generated checksum associated with the first data unit; making a second determination that the new checksum and the previously generated checksum match; and in response to the second determination: generating a backup using the plurality of data units.

In general, in one aspect, the embodiments described herein relate to a non-transitory computer readable medium which includes computer readable program code, which when executed by a computer processor enables the computer processor to perform a method for validating a recovery log. The method includes obtaining, by a validation manager of a backup storage, a first snapshot comprising a first plurality of data units; making a first determination that the snapshot is associated with synchronous validation; in response to the first determination: writing a first data unit of the plurality of data units to a recovery log; computing a new checksum associated with the first data unit; comparing the new checksum with a previously generated checksum associated with the first data unit; making a second determination that the new checksum and the previously generated checksum match; and in response to the second determination: generating a backup using the plurality of data units.

In general, in one aspect, embodiments described herein relate to a system for validating a recovery log. The system includes a client that includes file system data and a backup storage that includes a processor and memory that is configured to perform a method. The method includes obtaining, by a validation manager of the backup storage, a first snapshot comprising a first plurality of data units; making a first determination that the snapshot is associated with synchronous validation; in response to the first determination: writing a first data unit of the plurality of data units to a recovery log; computing a new checksum associated with the first data unit; comparing the new checksum with a previously generated checksum associated with the first data unit; making a second determination that the new checksum and the previously generated checksum match; and in response to the second determination: generating a backup using the plurality of data units.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
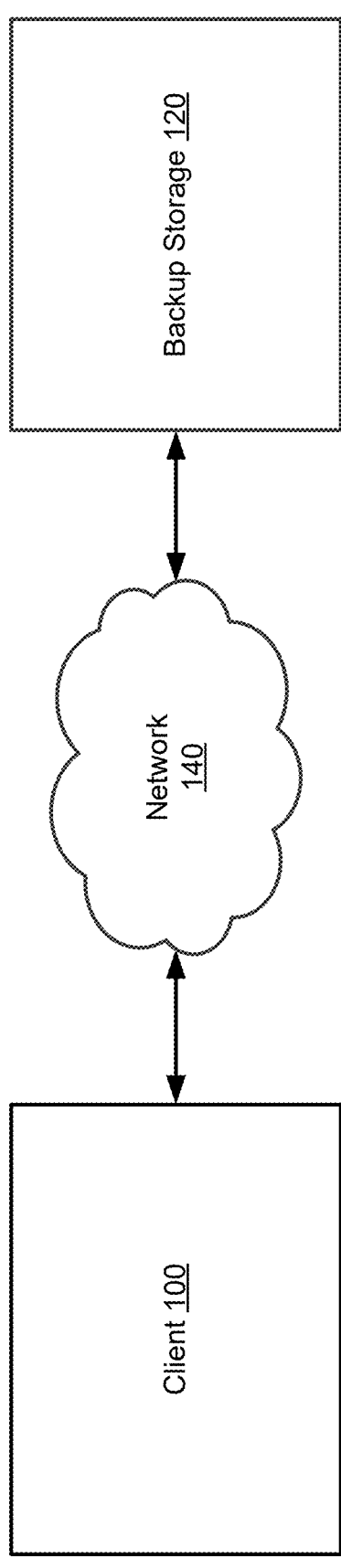
FIG. 1A shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and non-transitory computer readable mediums for verifying (also referred to herein as validating) data units included in recovery logs.

Many file systems implement high-speed persistent storage-based recovery logs for crash recovery. As an example, the Single Node DataDomain (DD) file system (DDFS) uses non-volatile storage, such as NVRAM, to log various metadata and data in order to minimize the write latency during ingest. In the event of a crash, the file system replays the contents of the NVRAM to recover all data that has been committed but not persisted to disk. The NVRAM is partitioned into several hard partitions and a partition is assigned to each file system layer which needs to log data to NVRAM. Each layer manages its own partition in terms of layout and space usage. The DD NVRAM Logging architecture also supports a high-availability (HA) solution, where the Active Node's NVRAM writes are mirrored to a Passive Node's NVRAM. In the event of Active Node failover, the Passive node can replay its own NVRAM and recover all the data.

In modern scale-out data protection appliances, built on a software defined micro-services based architecture, the NVRAM is replaced by a non-volatile memory express (NVMe) based Distributed Log (D3 Log), which is persistent and highly available. Some file systems implement frequent flushing of data from staged storage, such as NVRAM, as means of reducing data loss in cases where the content of NVRAM is lost. As persistent storage like NVRAM holds recently written data, there is a possibility that some data writes were acknowledged by the filesystem as fully written to disk eventhough the data had only been staged to the NVRAM for later flushing to disk. To prevent data loss, file systems frequently flush data from the recovery log, typically every N minutes, ensuring that any potential data loss is limited to the last N minutes.

Numerous hours are spent by support personnel trying to recover the customer file systems to a consistent state. Solving data inconsistency situations is imperative to ensure data recovery. Data in recovery logs can become inconsistent in different ways, for example: (i) hardware failures of the NVRAM device or kernel driver bugs, (ii) network failures, such as a bit flip over the wire, and (iii) software bugs that cause memory corruptions, which make their way into the recovery logs. In all these cases, the file system is unable to replay crash recovery logs. The standard practice in such occurrences, which happen more frequently than desired, is to throw away the data in the recovery logs and bring up the file system from the last consistent snapshot. This may result in the loss of the last N minutes of data, at the most, because the dirty data is flushed to disk every N minutes.

In a clustered file system implementation, flushing all dirty data every N number of minutes exerts immense pressure on the disks, choking data writes in the file system. For example, performing a periodic sync every 15 minutes in a multi node cluster is going to be very expensive. There are two aspects to consider: (i) wasted space due to internal fragmentation in the backend object storage caused by partially filled objects, and (ii) pressure on object storage caused by queued all at once every 15 minutes can overwhelm the IOPS capability.

To address, at least in part, the aforementioned issues discussed above, embodiments disclosed herein relate to systems, methods, and/or non-transitory computer readable mediums that enable synchronous and asynchronous validation of data units in recovery logs. More specifically, embodiments disclosed herein may verify data units during backup generation using checksums either synchronously or asynchronously prior to flushing the data to storage. Accordingly, the data units in the recovery logs and in backup storage may be corruption free, and the reliability and availability of data may be improved while preventing data loss or data corruption scenarios.

FIG. 1A shows a diagram a system in accordance with one or more embodiments disclosed herein. The system may include a client (100), a backup storage (120), and a network (140). The components of the system illustrated in FIG. 1A may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1A is discussed below.

In one or more embodiments, the client (100) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the clients (100) described herein and/or all, or a portion, of the methods illustrated in FIGS. 2A-2C. The client (100) may be implemented using other types of computing devices without departing from the embodiments disclosed herein. For additional details regarding computing devices, refer to FIG. 3.

The client (100) may be implemented using logical devices without departing from the embodiments disclosed herein. For example, the client (100) may include virtual machines that utilize computing resources of any number of physical computing devices to provide the functionality of the client (100). The client (100) may be implemented using other types of logical devices without departing from the embodiments disclosed herein.

In one or more embodiments, the client (100) may include the functionality to, or otherwise be programmed or configured to, perform computer implemented services for users of the client (100). The computer implemented services may include electronic mail communication services, database services, calendar services, inferencing services, and/or word processing services. The computer implemented services may include other and/or additional types of services without departing from embodiments disclosed herein. The client (100) may also include the functionality to obtain backup storage and recovery services from the backup storage (120). The client (100) may include the functionality to perform all, or a portion of, the methods discussed in FIGS. 2A-2C. The client (100) may include other and/or additional functionalities without departing from embodiments disclosed herein. For additional information regarding the client (100), refer to FIG. 1B.

In one or more embodiments, the backup storage (120) may be implemented using one or more computing devices.

A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-2C. The backup storage (120) may be implemented using other types of computing devices without departing from embodiments disclosed herein. For additional details regarding computing devices, refer to FIG. 3.

The backup storage (120) may be implemented using logical devices without departing from the embodiments disclosed herein. For example, the backup storage (120) may include virtual machines that utilize computing resources of any number of physical computing devices to provide the functionality of the backup storage (120). The backup storage (120) may be implemented using other types of logical devices without departing from the embodiments disclosed herein.

In one or more embodiments, the backup storage (120) may include the functionality to provide backup storage and recovery services for users of the client (100). As such, the backup storage (120) may include the functionality to (i) obtain snapshots from the client (100), (ii) verify data units of the snapshots either synchronously or asynchronously using a validation queue and recovery log (both discussed below), (iii) store backups (also referred to herein as file system backups), (iv) remediate recovery logs, and (v) provide backups to the client (100) for recovery purposes. The backup storage (120) may include the functionality to perform all, or a portion of, the methods of FIGS. 2A-2C. The backup storage (120) may include the other and/or additional functionalities without departing from embodiments disclosed herein. In one or more embodiments, to perform the services, the backup storage (120) may send/obtain requests and information to/from the client (100) through communications via network operations. For additional information regarding the backup storage (120), refer to FIG. 1C.

As used herein, "communication" may refer to simple data passing, or may refer to two or more components coordinating a job. As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, the network (140) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the network (140) described herein and/or all, or a portion, of the methods illustrated in FIGS. 2A-2C. The network (140) may be implemented using other types of computing devices without departing from the embodiments disclosed herein. For additional details regarding computing devices, refer to FIG. 3.

The network (140) may be implemented using logical devices without departing from the embodiments disclosed herein. For example, the network (140) may include virtual machines that utilize computing resources of any number of physical computing devices to provide the functionality of the network (140). The network (140) may be implemented using other types of logical devices without departing from the embodiments disclosed herein.

In one or more embodiments, the network (140) may represent a (decentralized or distributed) computing network and/or fabric configured for computing resource and/or messages exchange among registered computing devices (e.g., the client (100) and the backup storage (120)). As discussed above, components of the system may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (140) may be implemented using any combination of wired and/or wireless network topologies, and the network may be operably connected to the Internet or other networks. Further, the network (140) may enable interactions between, for example, the client (100) and the backup storage (120) through any number and type of wired and/or wireless network protocols (e.g., TCP, UDP, IPv4, etc.).

The network (140) may encompass various interconnected, network-enabled subcomponents (not shown) (e.g., switches, routers, gateways, cables etc.) that may facilitate communications between the components of the system. In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (140) and its subcomponents may be implemented using hardware, software, or any combination thereof.

In one or more embodiments, before communicating data over the network (140), the data may first be broken into smaller batches (e.g., data packets) so that larger size data can be communicated efficiently. For this reason, the network-enabled subcomponents may break data into data packets. The network-enabled subcomponents may then route each data packet in the network (140) to distribute network traffic uniformly.

In one or more embodiments, the network-enabled subcomponents may decide how real-time (e.g., on the order of ms or less) network traffic and non-real-time network traffic should be managed in the network (140). In one or more embodiments, the real-time network traffic may be high-priority (e.g., urgent, immediate, etc.) network traffic. For this reason, data packets of the real-time network traffic may need to be prioritized in the network (140). The real-time network traffic may include data packets related to, for example (but not limited to): videoconferencing, web browsing, voice over Internet Protocol (VOIP), etc.

Although the system of FIG. 1A is shown as having a certain number of components (e.g., 100, 120, 140), in other embodiments disclosed herein, the system may have more or fewer components. For example, there may be multiple clients and multiple backup storages. As another example, the functionality of each component described above may be split across components or combined into a single component. Further still, each component may be utilized multiple times to carry out an iterative operation.

Figure 1B:
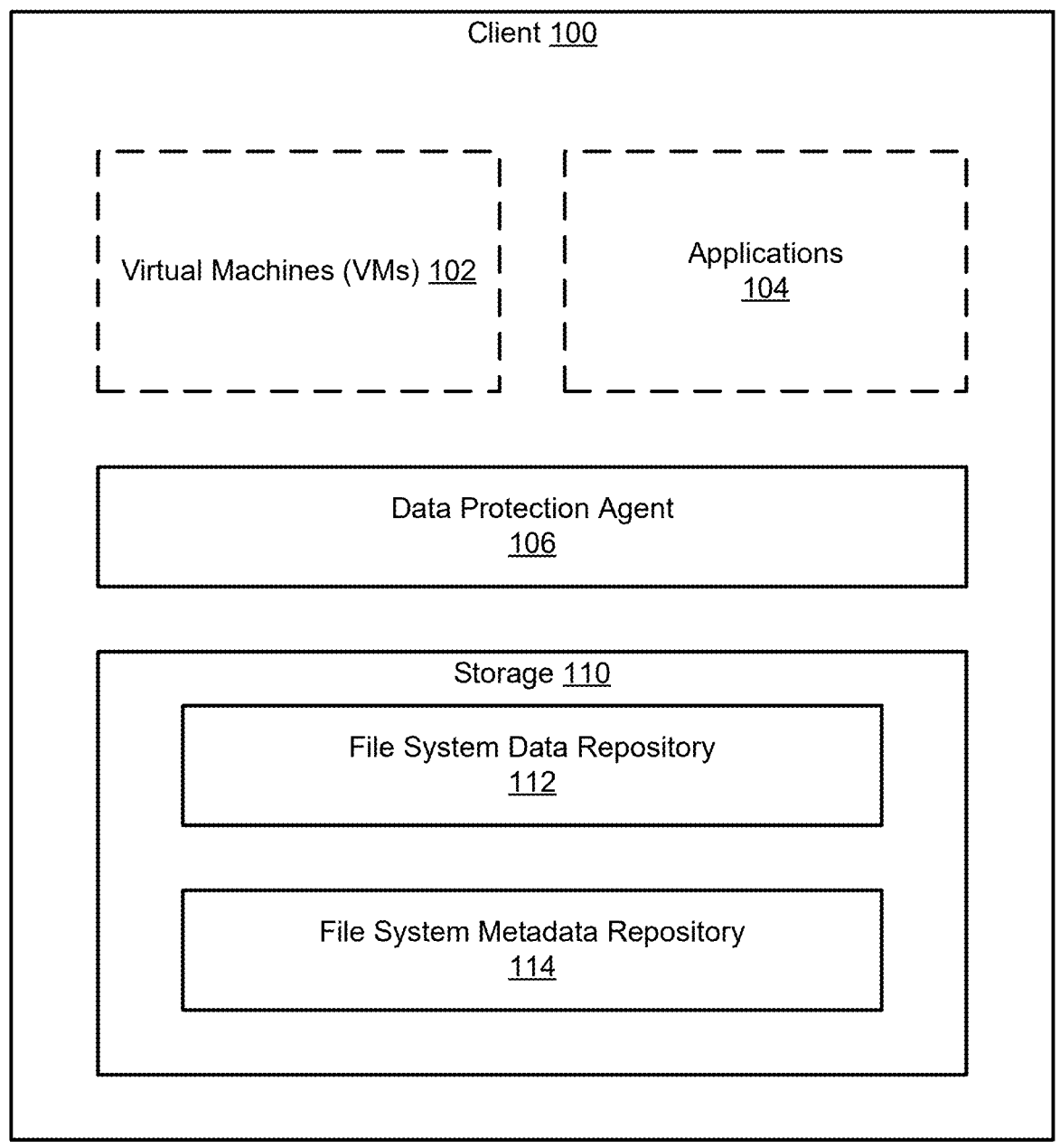
FIG. 1B shows a diagram of a client in accordance with one or more embodiments disclosed herein.

FIG. 1B shows a diagram of a client in accordance with one or more embodiments disclosed herein. The client (100) may be an embodiment of the client (100, FIG. 1A) discussed above. As discussed above, the client (100) may include the functionality to perform computer implemented services for users of the client (100) and may obtain backup storage and recovery services from the backup storage (120, FIG. 1A). To perform and obtain the aforementioned services, the client (100) may include virtual machines (VMs) (102), applications (104), a data protection agent (106), and storage (110). The client (100) may include other, additional, and/or fewer components without departing from embodiments disclosed herein. Each of the aforementioned components of the client (100) is discussed below.

In one or more embodiments disclosed herein, the virtual machines (102) are implemented as computer instructions, e.g., computer code, stored on a storage (e.g., 108) that when executed by a processor of the client (100) causes the client (100) to provide the functionality of the virtual machines (102) described throughout this Detailed Description. The virtual machines (102) may include the functionality to perform or otherwise provide computer implemented services to users of the client (100). The virtual machines (102) may include other and/or additional functionalities without departing from embodiments disclosed herein. The virtual machine may be managed by a hypervisor (e.g., computing instructions executing on the client (100)) (not shown). The hypervisor may be any appropriate hypervisor without departing from embodiments disclosed herein. The virtual machines (102) may include, or be operatively connected to, one or more applications (104). Each application may be a portion of the computer instructions discussed above, which when executed by a processor of the client (100), cause the client (100) to perform a portion of the computer implemented services performed by the virtual machines (102). For example, a database application may perform database services, a word processing application may perform word processing services, and an electronic mail communication application may perform electronic mail communication services, etc.

In one or more embodiments disclosed herein, the data protection agent (106) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data protection agent (106) described throughout this Detailed Description.

In one or more embodiments disclosed herein, the data protection agent (106) is implemented as computer instructions, e.g., computer code, stored on a storage (e.g., 110) that when executed by a processor of the client (100) causes the client (100) to provide the functionality of the data protection agent (106) described throughout this Detailed Description.

In one or more embodiments, the data protection agent (106) may include the functionality to perform local data protection services for the client (100). To perform the local data protection services, the data protection agent (106) may obtain requests and information from the backup storage (120, FIG. 1A), and send and respond to commands between the backup storages (120, FIG. 1A) and the virtual machines (102) and the applications (104). The data protection agent (106) may also include the functionality (i) to generate snapshots of file system data and/or file system metadata (discussed below), (ii) generate data units of the snapshot including checksums associated with the data of the data unit, and (iii) providing the snapshot including the data units to the backup storage (120, FIG. 1A) for backup generation. The data protection agent (106) may include other and/or additional functionalities without departing from embodiments disclosed herein.

In one or more embodiments, the storage (110) may be implemented using one or more volatile or non-volatile storages or any combination thereof. The storage (110) may include the functionality to, or otherwise be configured to, store and provide all, or portions, of information that may be used by the virtual machine (102), applications (104), and/or the data protection agent (106). The information stored in the storage (110) may include a file system data repository (112) and a file system metadata repository (114). The storage (110) may include other and/or additional information without departing from embodiments disclosed herein. Each of the aforementioned types of information is discussed below.

In one or more embodiments disclosed herein, the applications (104) and/or users of the applications (104) generate data during the performance of computer implemented services. The data may be stored in a file system. In one or more embodiments disclosed herein, a file system is an organizational data structure that tracks how application data is stored and retrieved in a system (e.g., in storage (120) of the client (100), i.e., the file system data repository (112)). The file system may specify references to assets of applications and any asset data associated with each asset. An asset may be an individual data object in the file system. An asset may be, for example, a folder associated with an application(s) (e.g., 104). Each asset may include any number of elements. The elements may be, for example, subfolders and/or files associated with the application(s) (e.g., 104). Each file may include file data. The file data may include, for example, database data, calendar data, electronic mail communications data, etc.

In one or more embodiments, the file system data repository (112) may include one or more data structures that may be used to generate snapshots used to generate backups. The file system data repository (112) may include file data generated by the applications (104) and/or users of the applications (104) as discussed above. The file data may be any type of data such as database data and email data generated by users of the applications (104) without departing from the invention. Each application of the applications (104) may be associated with any number of assets (e.g., files, folders, etc.), each asset may include any quantity of file data, and furthermore, each asset may include any number of elements without departing from embodiments disclosed herein. Users and/or applications (104) may use the file data of the file system data repository (112) when obtaining computer implemented services from the client (100). Additionally, the file data of the file system data repository (112) may be obtained by the data protection agent (106) to generate snapshots. The file data of the file system data repository (112) may be used by other and/or additional entities for other and/or additional purposes without departing from embodiments disclosed herein. Additionally, the file system data repository (112) may include other and/or additional types of information without departing from embodiments disclosed herein.

In one or more embodiments, the file system metadata repository (114) may include one or more data structures that include information regarding files included in the file system stored in the file system data repository (112). The information may include, for example, an entry for each file that includes: file identifiers associated with the file, the file length or size, one or more data runs associated with one or more data blocks of the file, data block identifiers associated with the one or more data blocks of the file, the creation date, the modification date, the application identifier associated with the file, and a parent file or folder associated with the file. The file system metadata repository (114) may include other and/or additional information associated with the files stored in the file system data repository (112) without departing from embodiments disclosed herein. The file system metadata repository (114) may be used by the users of the applications (104) and/or the applications (104) during the performance of computer implemented services. The file system metadata repository (114) may be used by the data protection agent (106) to generate snapshots. The information included in the file system metadata repository (114) may be generated by the applications (104) and/or users of the applications (104) during the performance of computer implemented services and stored in the file system metadata repository (114).

While the data structures (e.g., 112, 114) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (110), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 1C:
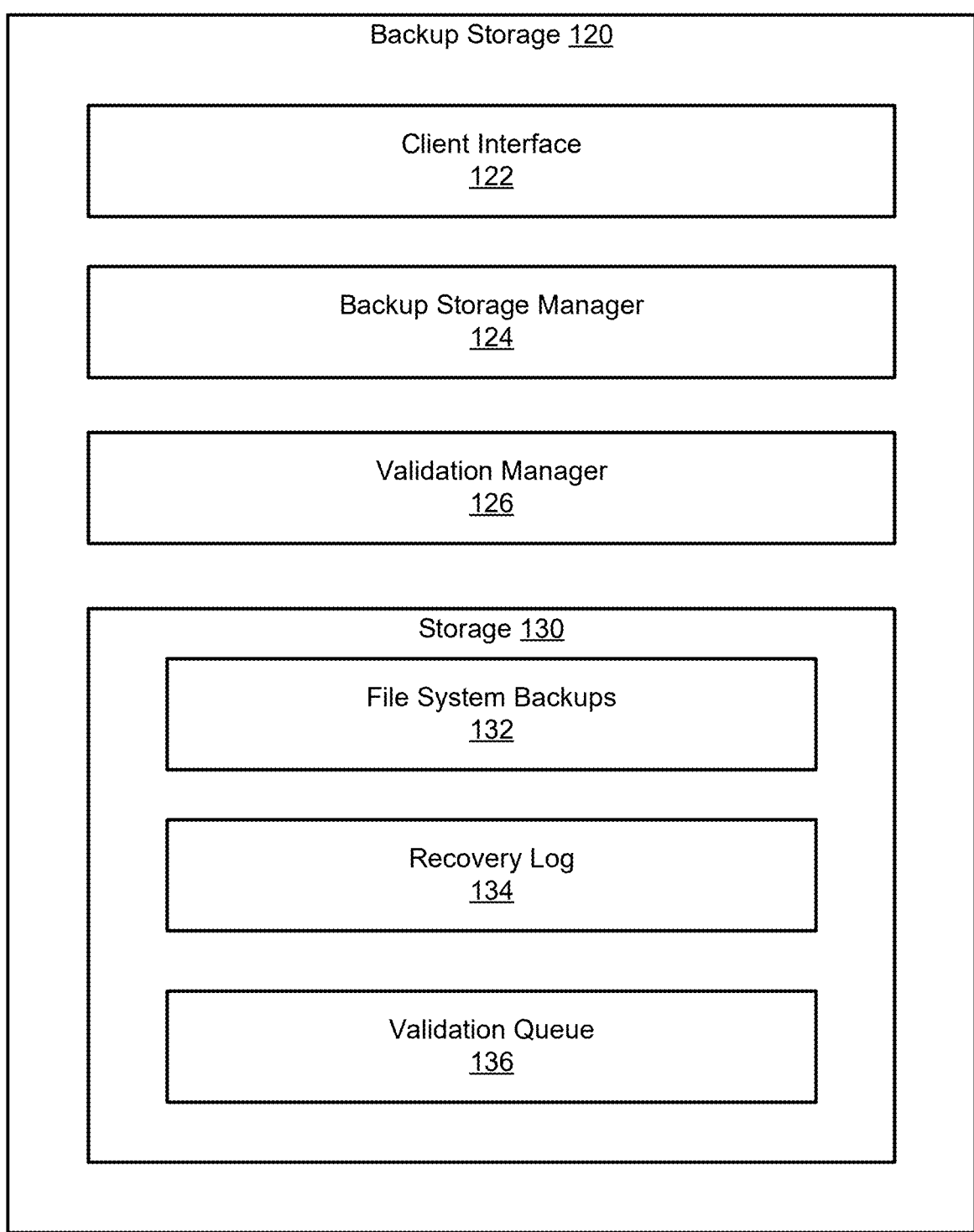
FIG. 1C shows a diagram of a backup storage in accordance with one or more embodiments disclosed herein.

FIG. 1C shows a diagram of a backup storage in accordance with one or more embodiments disclosed herein. The backup storage (120) may be an embodiment of the backup storage (120, FIG. 1A) discussed above. As discussed above, the backup storage (120) may include the functionality to perform backup storage and recovery services for the client (100, FIG. 1A). To perform and obtain the aforementioned services, the backup storage (120) may include a client interface (122), a backup storage manager (124), a validation manager (126), and storage (130). The backup storage (120) may include other, additional, and/or fewer components without departing from embodiments disclosed herein. Each of the aforementioned components of the backup storage (120) is discussed below.

In one or more embodiments disclosed herein, the client interface (122) may represent an application programming interface (API) (e.g., a communication channel, an entry point to the backup storage, etc.) for the backup storage (120). To that extent, the client interface (122) may employ a set of subroutine definitions, protocols, and/or hardware/software components for enabling communications between the backup storage (120) and external entities (e.g., the client (100). One of ordinary skill will appreciate that the client interface (122) may perform other functionalities without departing from the scope of the invention. The client interface (122) may be implemented using hardware, software, or any combination thereof.

In one or more embodiments disclosed herein, the backup storage manager (124) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the backup storage manager (124) described throughout this Detailed Description.

In one or more embodiments disclosed herein, the backup storage manager (124) is implemented as computer instructions, e.g., computer code, stored on a storage (e.g., 130) that when executed by a processor of the backup storage (120) causes the backup storage (120) to provide the functionality of the backup storage manager (124) described throughout this Detailed Description.

In one or more embodiments, the backup storage manager (124) may include the functionality to perform backup storage management services for the backup storage (120). The backup storage management services may include (i) obtaining snapshots from the client (100, FIG. 1A) (e.g., in conjunction with the client interface (122), (ii) storing data units in the recovery log and validation queue (both discussed below), and (iii) generating file system backups (132). The backup storage manager (124) may include the functionality to perform all, or a portion of, the methods of FIGS. 2A-2C. The backup storage manager (124) may include other and/or additional functionalities without departing from embodiments disclosed herein.

In one or more embodiments disclosed herein, the validation manager (126) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the validation manager (126) described throughout this Detailed Description.

In one or more embodiments disclosed herein, the validation manager (126) is implemented as computer instructions, e.g., computer code, stored on a storage (e.g., 130) that when executed by a processor of the backup storage (120) causes the backup storage (120) to provide the functionality of the validation manager (126) described throughout this Detailed Description.

In one or more embodiments, the validation manager (126) may include the functionality to perform validation services for the backup storage (120). The validation services may include (i) generating checksums associated with data units, (ii) comparing checksums with previously generated checksums to validate the data units in the recovery log and validation queue, and/or (iii) adding and removing data units from the validation queue. The validation manager (126) may include the functionality to perform all, or a portion of, the methods of FIGS. 2A-2C. The validation manager (126) may include other and/or additional functionalities without departing from embodiments disclosed herein.

In one or more embodiments, the storage (130) may be implemented using one or more volatile or non-volatile storages or any combination thereof. The storage (130) may include the functionality to, or otherwise be configured to, store and provide all, or portions, of information that may be used by the backup storage manager (124), the validation manager (126), and/or the client (100, FIG. 1A). The information stored in the storage (130) may include file system backups (132), a recovery log (134), and a validation queue (136). The storage (130) may include other and/or additional information without departing from embodiments disclosed herein. Each of the aforementioned types of information is discussed below.

In one or more embodiments, the file system backups (132) may refer to one or more data structures that include verified snapshots of file system data (e.g., 112, FIG. 1B) stored in non-volatile storage (e.g., disks) that may be retrieved and used for recovery of the file system data (e.g., 112, FIG. 1B) of the client during data loss scenarios. The file system backups (132) may be generated by the backup storage manager (124) in conjunction with the validation manager (126) via the methods discussed in FIGS. 2A-2C. The file system backups (132) may include any quantity or type of file system data (e.g., 112, FIG. 1B) stored for data protection purposes without departing from embodiments disclosed herein. The file system backups (132) may include other and/or additional information and may be used for other and/or additional purposes without departing from embodiments disclosed herein.

In one or more embodiments, the recovery log (134) may refer to one or more data structures that includes an order list of data units that make up a snapshot that may be used to recover file system data (e.g., 112, FIG. 1B) of the client. The list may be ordered based on the time that the corresponding data units were generated on the client (100, FIG. 1A) and/or written to the backup storage (120). The data unit may include object data (e.g., database data, application data, file data, email data, word processing data, etc.) of the file system data (e.g., 112, FIG. 1B), a corresponding checksum, and a data unit identifier (e.g., a unique combination of alphanumeric characters used to specify a particular data unit from other data units). The checksum may refer to a small sized block of data derived from, and representative of, the object data of the data unit which is a larger block of data. The checksum may be generated using any appropriate checksum generation algorithm (e.g., cyclic redundancy check (CRC) 32 or 64, Secure Hash Algorithm 1 (SHA-1), etc.) without departing from embodiments disclosed herein. The recovery log (134) may include other information such as a timestamp specifying creation time. The recovery log (134) may be generated and updated by the backup storage manager (124) and validated by the validation manager (126) via the method discussed below in FIGS. 2A-2C. The recovery log (134) may be replayed to recover lost data in the client to a certain point in time. In other words, the backup storage may retrieve data units in the order they are specified and the recovery log (134) from the file system backups and send them to the client (100, FIG. 1A) to restore the client to a point in time. The recovery log (134) may include other and/or additional information and may be used for other and/or additional purposes without departing from embodiments disclosed herein.

In one or more embodiments, the validation queue (136) may refer to one or more data structures that include an ordered list of data units that may be waiting to be validated by the validation manager (126). The data units may be written to the validation queue (136) by the backup storage manager (124) and pulled off the validation queue (136) by the validation manager (126) during synchronous or asynchronous validation as discussed in the methods of FIGS. 2A-2C. In one or more embodiments, the validation queue (136) may be implemented as a first-in-first-out (FIFO) queue. The validation queue (136) may also include one or more conditional variables with barrier conditions that may specify when to resume completion of a backup thread during asynchronous validation. The conditional variable may be a parameter that specifies a barrier condition and a backup thread. The barrier condition may specify the last data unit in the validation queue (136) (e.g., via a pointer, include the data unit identifier, etc.) that may be validated before resuming the backup thread to enable asynchronous validation. Accordingly, the validation queue (136) and the backup thread may not result in the generation of out of synced or incorrect backups. The validation queue (136) may include other and/or additional information and be used for other and/or additional purposes without departing from embodiments disclosed herein.

While the data structures (e.g., 132, 134, 136) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (130), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 2A:
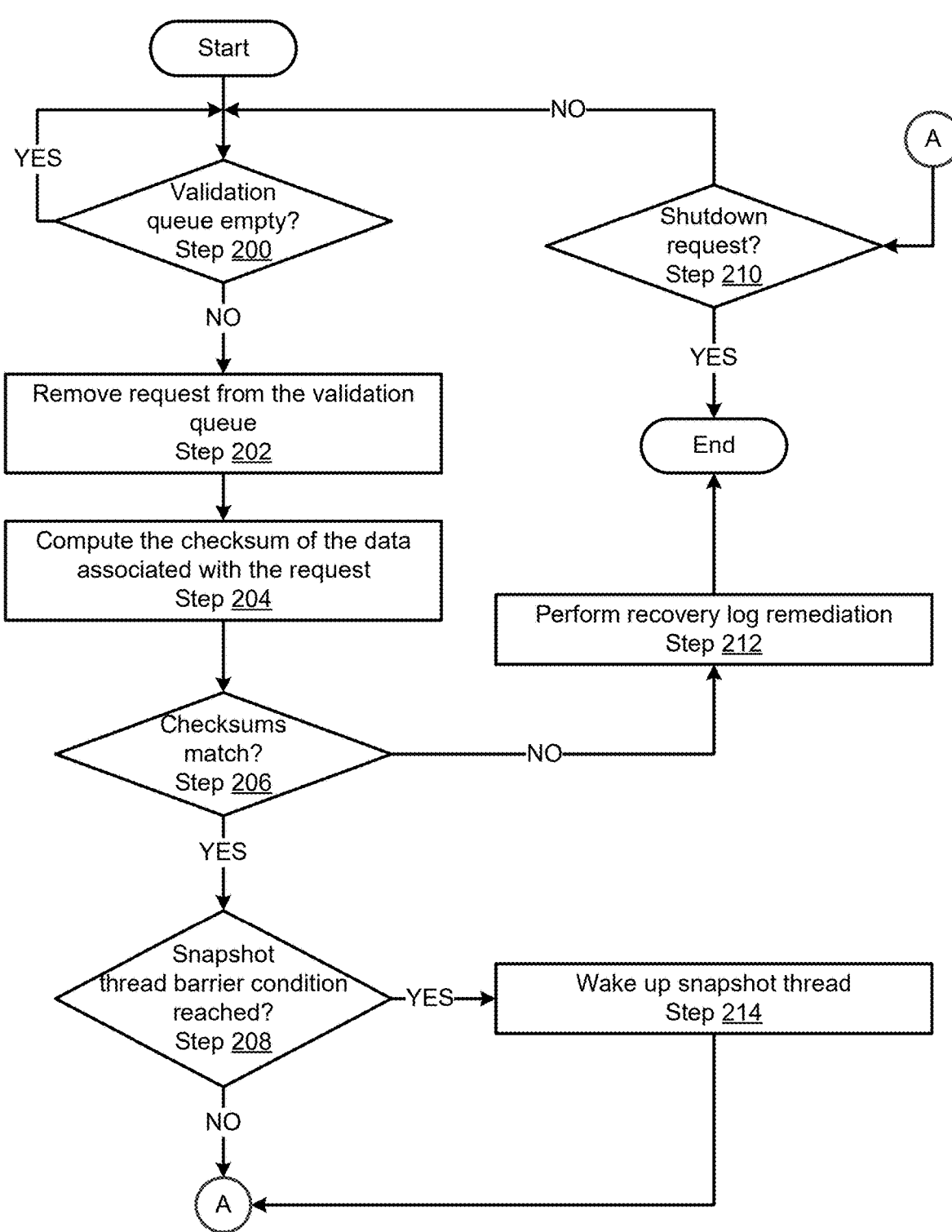
FIG. 2A shows a flowchart of a method for performing asynchronous verification in accordance with one or more embodiments disclosed herein.

FIG. 2A shows a flowchart of a method for performing asynchronous verification in accordance with one or more embodiments disclosed herein. The method shown in FIG. 2A may be performed by, for example, a validation manager of a backup storage (e.g., 126, FIG. 1C). Other components of the system in FIGS. 1A-1C may perform all, or a portion, of the method of FIG. 2A without departing from the scope of the embodiments described herein. While FIG. 2A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a determination is made as to whether the validation queue is empty. As discussed above, for asynchronous verification, the backup storage manager of the backup storage may add data units to the validation queue when the data units are obtained from a client. In one or more embodiments, the validation manager may check the validation queue to determine whether there are any data units in the validation queue. In one or more embodiments, if validation manager finds a data unit in the validation queue, then the validation manager may determine that the validation queue is not empty. In one or more embodiments, if validation manager does not find a data unit in the validation queue, then the validation manager may determine that the validation queue is not empty. The determination as to whether or not the validation queue is empty may be made via other and/or additional methods without departing from embodiments disclosed herein.

In one or more embodiments disclosed herein, if it is determine that the validation queue is not empty, then the method proceeds to Step 202. In one or more embodiments disclosed herein, if it is determine that the validation queue is empty, then the method repeat Step 200 and wait for a data unit to be added to the validation queue.

In Step 202, a request is removed from the validation queue. In one or more embodiments, the validation manager may select a request and remove it from the validation queue. The request may include a data unit and a request to verify the contents of the data unit. The validation manager may remove the request based on its positioning in the validation queue. In the embodiments that the validation queue is implemented as FIFO queue, the validation manager may select the data unit or request that was the first data unit added to the queue of the data units currently included in the validation queue. The request and data unit may be removed from the validation queue via other and/or additional methods without departing from embodiments disclosed herein.

In Step 204, the checksum of the data associated with the request is computed. In one or more embodiments, the validation manager may obtain the data of the data unit (e.g., all or a portion of a data object included in the data unit). The validation manager may then compute a checksum of the data using any appropriate checksum generation algorithm or cryptographic hash function (e.g., cyclic redundancy check (CRC) 32 or 64, Secure Hash Algorithm 1 (SHA-1), etc.) without departing from embodiments disclosed herein. The checksum generation algorithm may be the same checksum generation algorithm used to compute the original checksum included in the data unit. The checksum of the data associated with the request may be computed via other and/or additional methods without departing from embodiments disclosed herein.

In Step 206, a determination is made as to whether the checksums match. In one or more embodiments, the validation manager may compare the new checksum (generated in Step 204) with the original checksum included in the data unit which was generated during the creation of the data unit. If the checksums match, then the data in the data unit matches the original data used to generate the data unit. However, if the checksums do not match, then the data unit in the validation queue and the recovery log may have been corrupted, lost, or otherwise modified or lost in an undesirable manner between generation, transmission to the backup storage, and processing by the backup storage. In one or more embodiments, if the new checksum is the same as the original checksum, then the validation manager may determine that the checksums match. In one or more embodiments, if the new checksum is different from the original checksum, then the validation manager may determine that the checksums do not match. The determination as to whether the checksums match may be made via other and/or additional methods without departing from embodiments disclosed herein.

In one or more embodiments disclosed herein, if it is determined that the checksums match, then the method proceeds to Step 208. In one or more embodiments disclosed herein, if it is determined that the checksums do not match, then the method proceeds to Step 212.

In Step 208, a determination is made as to whether the snapshot thread barrier condition is reached. As discussed above, the validation queue may include one or more conditional variables specifying a barrier condition associated with a snapshot thread. As discussed above, the barrier condition may specify the last data unit to verify before resuming the snapshot thread. In one or more embodiments, the validation manager may identify all of the barrier conditions included in the conditional variables and may compare the data unit that was just verified with the barrier conditions. In one or more embodiments, if the data unit matches a barrier condition, then the validation manager may determine that the snapshot thread barrier condition is reached. In one or more embodiments, if the data unit does not match a barrier condition, then the validation manager may determine that the snapshot thread barrier condition is not reached. The determination as to whether the snapshot thread barrier condition is reached may be made via other and/or additional methods without departing from embodiments disclosed herein.

In one or more embodiments, if it is determined that the snapshot thread barrier condition is reached, then the method proceeds to Step 214. In one or more embodiments, if it is determined that the snapshot thread barrier condition is not reached, then the method proceeds to Step 210.

In Step 210, a determination is made as to whether a shutdown request was received. In one or more embodiments, the validation manager may obtain a shutdown request to terminate the asynchronous verification of the data units. The shutdown request may be obtained from the backup storage manager, the client, or a user of the backup storage (e.g., a system administrator). The request may be obtain using any appropriate technique for data transmission without departing from embodiments disclosed herein. For example, the request may be obtained as a message that includes one or more network packets through one or more network devices that operatively connect the validation manager and the backup storage manager and the client. As yet another example, the user may provide the request via inputs on a user interface (e.g., a graphical user interface, a command-line interface, etc.). In one or more embodiments, if the request has been obtained by the validation manager, then the validation manager may determine that a shutdown request was received. In one or more embodiments, if the request has not been obtained by the validation manager, then the validation manager may determine that a shutdown request was not received. The determination as to whether a shutdown request was received may be made via other and/or additional methods without departing from embodiments disclosed herein.

In one or more embodiments disclosed herein, if it is determined that the shutdown request was received, then the method ends following Step 210. In one or more embodiments disclosed herein, if it is determined that the shutdown request was not received, then the method proceeds to Step 200.

In Step 212, recovery log remediation is performed. In one or more embodiments, the validation manager may perform one or more recovery log remediation steps to remediate the recovery log. The recovery log remediation steps may include, for example, (i) notifying a user (e.g., a system administrator) of the backup storage that the data unit was corrupted, (ii) notifying the user of the client that the data unit was corrupted, (iii) obtaining a new snapshot or data unit and reperforming asynchronous validation and backup generation, (iv) obtaining instructions from the user of the client or the user of the backups storage and executing the instruction, etc. The recovery log remediation steps may include other and/or additional types of recovery log remediation steps without departing from embodiments disclosed herein. The recovery log remediation may be performed via other and/or additional methods without departing from embodiments disclosed herein.

In one or more embodiments disclosed herein, the method ends following Step 212.

In Step 214, the snapshot thread may be woken up. In one or more embodiments, the validation manager may send a notification to the backup storage manager to wake up or otherwise resume the snapshot thread. The notification may include the snapshot thread identifier. In response to obtaining the notification, the backup storage manager may resume the snapshot thread and complete the backup generation. The snapshot thread may be woken up via other and/or additional methods without departing from embodiments disclosed herein.

In one or more embodiments disclosed herein, the method proceeds to Step 210 following Step 214.

Figure 2B:
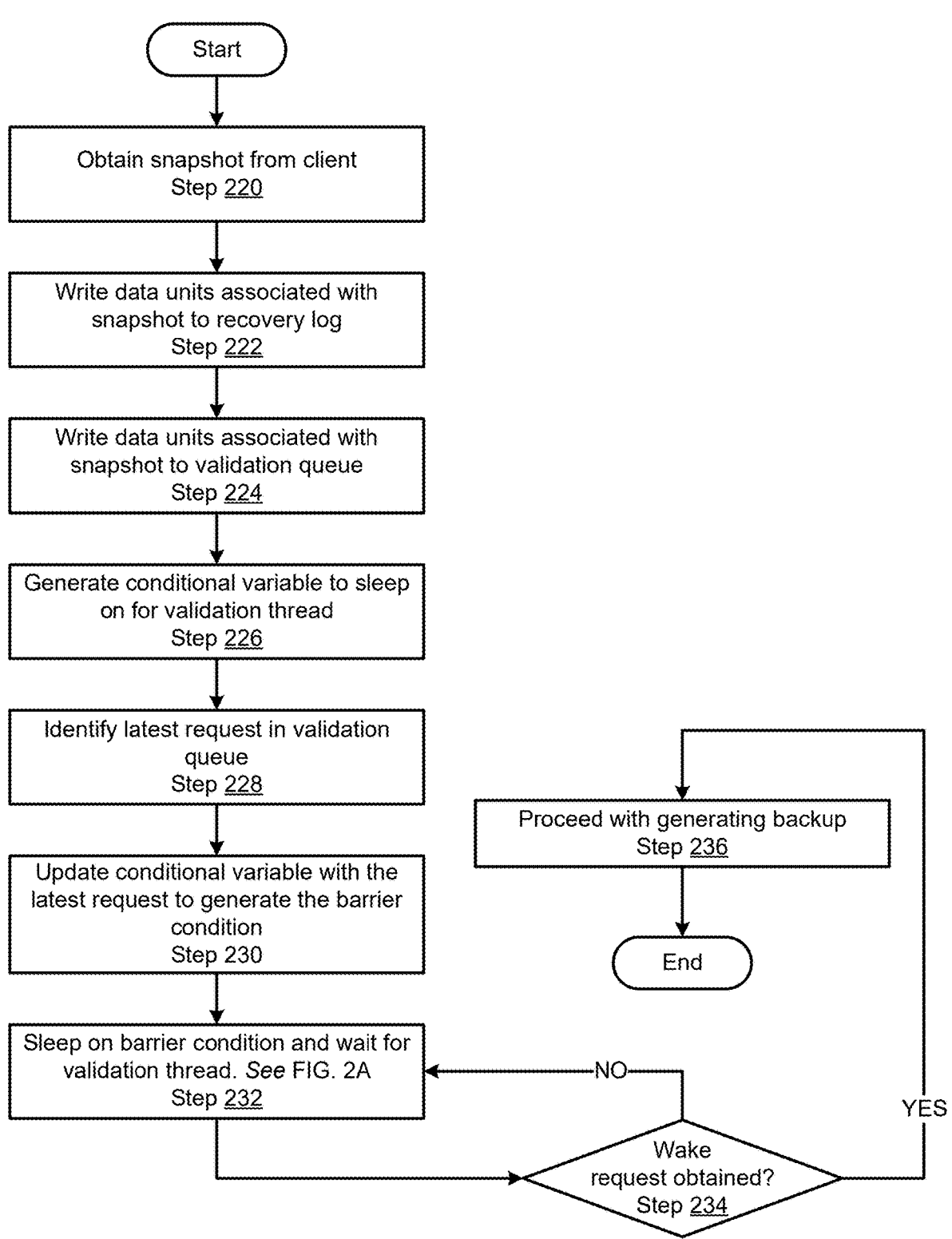
FIG. 2B shows a flowchart of a method for generating a backup using asynchronous verification in accordance with one or more embodiments disclosed herein.

FIG. 2B shows a flowchart of a method for generating a backup using asynchronous verification in accordance with one or more embodiments disclosed herein. The method shown in FIG. 2B may be performed by, for example, a backup storage manager of a backup storage (e.g., 124, FIG. 1C). Other components of the system in FIGS. 1A-1C may perform all, or a portion, of the method of FIG. 2B without departing from the scope of the embodiments described herein. While FIG. 2B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 220, a snapshot is obtain from the client. In one or more embodiments, the client may generate a snapshot of all or a portion of the file system data. The snapshot may be generated based on a backup generation schedule specifying points in time to generate backups of the file system data, or the snapshot may be generated in response to obtaining a request from the user of the client. In one or more embodiments, the client may generate and include the data units of the snapshot prior to providing the snapshot to the backup storage. The snapshot may be obtained from the client using any appropriate method of data transmission without departing from embodiments disclosed herein. The snapshot may be sent as a message that includes one or more network packets through one or more network devices that operatively connect the backup storage and the client. A snapshot may be obtained from the client via other and/or additional methods without departing from embodiments disclosed herein.

In Step 222, the data units associated with the snapshot are written to the recovery log. In one or more embodiments, the backup storage manager may parse the snapshot and obtain the data units of the snapshot. The backup storage manager may then write the data units (or copies of the data units) to the recovery log in the order in which the data units were obtained or included in the snapshot. The data units associated with the snapshot may be written to the recovery log via other and/or additional methods without departing from embodiments disclosed herein.

In Step 224, the data units associated with the snapshot are written to the validation queue. In one or more embodiments, the backup storage manager may parse the snapshot and obtain the data units of the snapshot. The backup storage manager may then write the data units (or copies of the data units) to the validation queue in the order in which the data units were obtained or included in the snapshot. The backup storage manager may include requests to perform verification with the data units written to the validation queue. The data units associated with the snapshot may be written to the validation queue via other and/or additional methods without departing from embodiments disclosed herein.

In Step 226, a conditional variable to sleep on for the validation thread is generated. In one or more embodiments, the backup storage manager generates an initial parameter that includes the snapshot thread identifier associated with the current snapshot thread performed by the backup storage manager. The conditional variable to sleep on for the validation thread may be generated via other and/or additional methods without departing from embodiments disclosed herein.

In Step 228, the latest request in the validation queue is identified. In one or more embodiments, the backup storage manager identifies the latest request. The last request may be identified by determining the last data unit written to the validation queue that is associated with the snapshot. In one or more embodiments, each data unit associated with the snapshot may further include the snapshot identifier associated with the snapshot. The latest request in the validation queue may be identified via other and/or additional methods without departing from embodiments disclosed herein.

In Step 230, the conditional variable is updated with the latest request to generate the barrier condition. In one or more embodiments, the backup storage manager generates a barrier condition associated with the last data unit included in the validation queue associated with the snapshot identified in Step 228. The backup storage manager may include the data unit identifier associated with the last data unit, generate a pointer that specifies the last data unit, or otherwise includes an indication that the last data unit is the data unit after which the snapshot thread is resumed. The conditional variable may be updated with the latest request to generate the barrier condition via other and/or additional methods without departing from embodiments disclosed herein.

In Step 232, sleep on the barrier condition and wait on the validation thread is initiated. In one or more embodiments, the backup storage manager may pause the snapshot thread and wait for the validation thread to perform asynchronous verification of the data units of the snapshot prior to finishing the snapshot thread. Accordingly, the data units may be verified prior to completing the snapshot thread and flushing the data units to disks and long term storage to ensure that the flushed/stored data used to generate backups is not corrupt in any way. In the meantime, the backup storage manager may perform other snapshot backup threads with synchronous or asynchronous verification while waiting on the current snapshot thread. The sleep on the barrier condition and wait on the validation thread may be initiated via other and/or additional methods without departing from embodiments disclosed herein.

In Step 234, a determination is made as to whether a wake request is obtained. In one or more embodiments, as discussed above in FIG. 2A, the validation manager may send a notification when the barrier condition is reached. In one or more embodiments, the backup storage manager may wait until the validation manager provides the aforementioned notification before resuming the snapshot thread. In one or more embodiments disclosed herein, if the backup storage manager obtains the notification from the validation manager to resume the snapshot thread, then the backup storage manager may determine that the wake request was obtained. In one or more embodiments disclosed herein, if the backup storage manager does not obtain the notification from the validation manager to resume the snapshot thread, then the backup storage manager may determine that the wake request was not obtained. The determination as to whether a wake request was obtained may be made via other and/or additional methods without departing from embodiments disclosed herein.

In one or more embodiments disclosed herein, if it is determined that the wake request was obtained, then the method proceeds to Step 234. In one or more embodiments disclosed herein, if it is determined that the wake request was not obtained, then the method proceeds to Step 232 to continue the sleep of the snapshot thread and the wait for the validation thread.

In Step 236, the backup generation is proceeded. In one or more embodiments, the backup storage manager may wait a configurable amount of time keeping the data units associated with the snapshot in the recovery log in for efficient recovery purposes. After the configurable amount of time has ended, the backup storage manager may flush the data units associated with the snapshot from the recovery log to a storage (e.g., disk) that acts as long term, archival backup storage to make room for subsequent snapshots. The backup generation may be proceeded via other and/or additional methods without departing from embodiments disclosed herein.

In one or more embodiments disclosed herein, the method ends following Step 236.

Figure 2C:
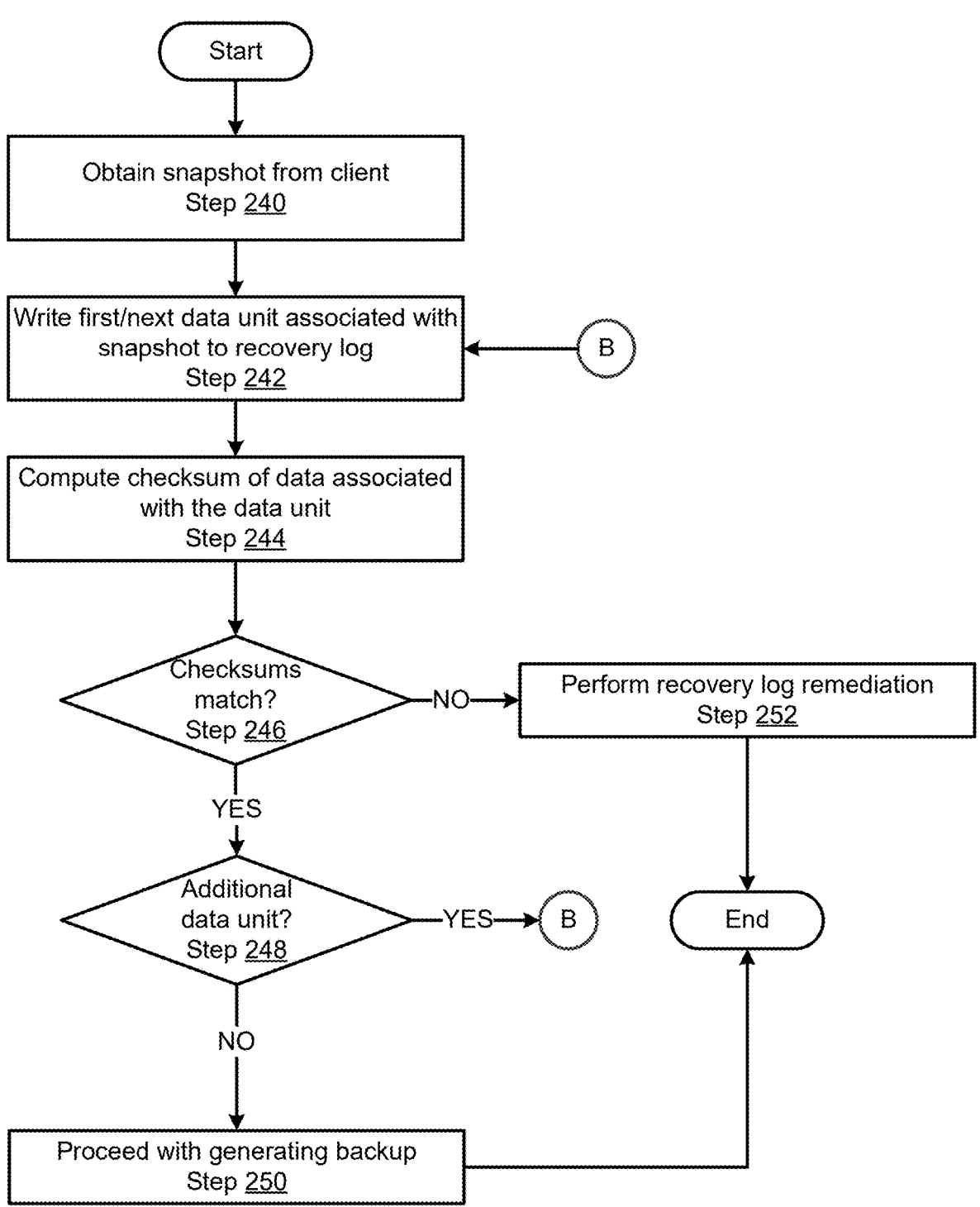
FIG. 2C shows a flowchart for generating a backup using synchronous verification in accordance with one or more embodiments disclosed herein.

FIG. 2C shows a flowchart for generating a backup using synchronous verification in accordance with one or more embodiments disclosed herein. The method shown in FIG. 2C may be performed by, for example, a backup storage manager of a backup storage (e.g., 124, FIG. 1C) and a validation manager (e.g., 126, FIG. 1C) of a backup storage. Other components of the system in FIGS. 1A-1C may perform all, or a portion, of the method of FIG. 2C without departing from the scope of the embodiments described herein. While FIG. 2C is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 240, a snapshot is obtained from a client. In one or more embodiments, the client may generate a snapshot of all or a portion of the file system data. The snapshot may be generated based on a backup generation schedule specifying points in time to generate backups of the file system data, or the snapshot may be generated in response to obtaining a request from the user of the client. In one or more embodiments, the client may generate and include the data units of the snapshot prior to providing the snapshot to the backup storage. The snapshot may be obtained from the client using any appropriate method of data transmission without departing from embodiments disclosed herein. The snapshot may be sent as a message that includes one or more network packets through one or more network devices that operatively connect the backup storage and the client. A snapshot may be obtained from the client via other and/or additional methods without departing from embodiments disclosed herein.

In Step 242, the next data unit associated with the snapshot is written to the recovery log. In one or more embodiments, the backup storage manager may parse the snapshot and obtain the data units of the snapshot. The backup storage manager may then write the newest (the most recently obtained data unit that has not yet been written) data unit (or a copy of the data unit) to the recovery log in the order in which the data units were obtained/generated or included in the snapshot. The next data unit associated with the snapshot may be written to the recovery log via other and/or additional methods without departing from embodiments disclosed herein.

In Step 244, the checksum of the data associated with the data unit is computed. In one or more embodiments, the validation manager may obtain the data of the data unit (e.g., all or a portion of a data object included in the data unit). The validation manager may then compute a checksum of the data using any appropriate checksum generation algorithm (e.g., cyclic redundancy check (CRC) 32 or 64, Secure Hash Algorithm 1 (SHA-1), etc.) without departing from embodiments disclosed herein. The checksum generation algorithm may be the same checksum generation algorithm used to compute the original checksum included in the data unit. The checksum of the data associated with the request may be computed via other and/or additional methods without departing from embodiments disclosed herein.

In Step 246, a determination is made as to whether the checksums match. In one or more embodiments, the validation manager may compare the new checksum (generated in Step 244) with the original checksum included in the data unit which was generated during the creation of the data unit. If the checksums match, then the data in the data unit matches the original data used to generate the data unit. However, if the checksums do not match, then the data unit in the recovery log may have been corrupted, lost, or otherwise modified or lost in an undesirable manner between generation, transmission to the backup storage, and processing by the backup storage. In one or more embodiments, if the new checksum is the same as the original checksum, then the validation manager may determine that the checksums match. In one or more embodiments, if the new checksum is different from the original checksum, then the validation manager may determine that the checksums do not match. The determination as to whether the checksums match may be made via other and/or additional methods without departing from embodiments disclosed herein.

In one or more embodiments disclosed herein, if it is determined that the checksums match, then the method proceeds to Step 248. In one or more embodiments disclosed herein, if it is determined that the checksums do not match, then the method proceeds to Step 252.

In Step 248, a determination is made as to whether there are additional data units associated with the snapshot. In one or more embodiments, the backup manager may then parse the snapshot to identify the next data unit to write to the recovery log. In one or more embodiments, if there is a data unit of the snapshot that has not been written to the recovery log and verified, then the backup storage manager may determine that there is an additional data unit. In one or more embodiments, if there is no data unit of the snapshot that has not been written to the recovery log and verified (all data units have been verified), then the backup storage manager may determine that there is not an additional data unit. The determination as to whether there are additional data units associated with the snapshot may be made via other and/or additional methods without departing from embodiments disclosed herein.

In one or more embodiments disclosed herein, if it is determined that there are additional data units associated with the snapshot, then the method proceeds to Step 242. In one or more embodiments disclosed herein, if it is determined that there are no additional data units associated with the snapshot, then the method proceeds to Step 250.

In Step 250, the backup generation is proceeded. In one or more embodiments, the backup storage manager may wait a configurable amount of time keeping the data units associated with the snapshot in the recovery log in for efficient recovery purposes. After the configurable amount of time has ended, the backup storage manager may flush the data units associated with the snapshot from the recovery log to a storage (e.g., disk) that acts as long term, archival backup storage to make room for subsequent snapshots. The backup generation may be proceeded via other and/or additional methods without departing from embodiments disclosed herein.

In one or more embodiments disclosed herein, the method ends following Step 250.

In Step 252, recovery log remediation is performed. In one or more embodiments, the validation manager may perform one or more recovery log remediation steps to remediate the recovery log. The recovery log remediation steps may include, for example, (i) notifying a user (e.g., a system administrator) of the backup storage that the data unit was corrupted, (ii) notifying the user of the client that the data unit was corrupted, (iii) obtaining a new snapshot or data unit and reperforming asynchronous validation and backup generation, (iv) obtaining instructions from the user of the client or the user of the backups storage and executing the instruction, etc. The recovery log remediation steps may include other and/or additional types of recovery log remediation steps without departing from embodiments disclosed herein. The recovery log remediation may be performed via other and/or additional methods without departing from embodiments disclosed herein.

In one or more embodiments disclosed herein, the method ends following Step 252.

Figure 3:
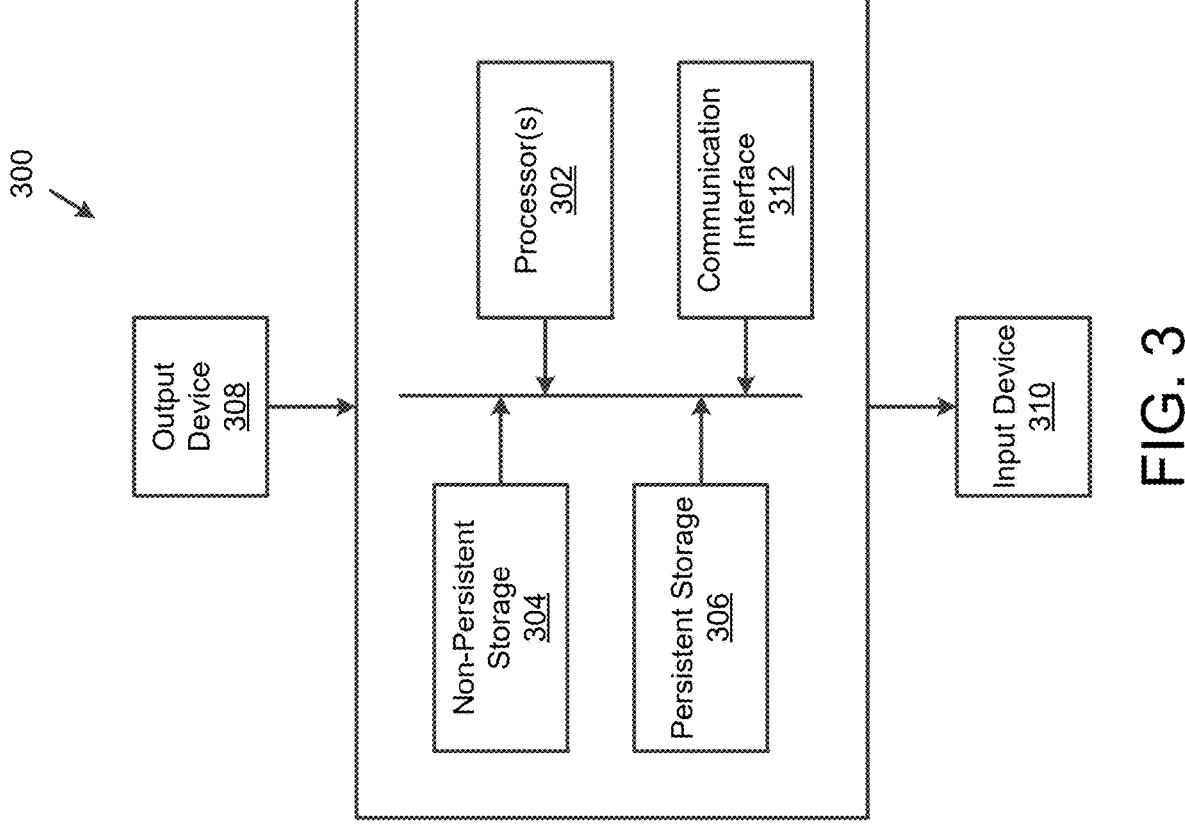
FIG. 3 shows a diagram of a computing device in accordance with one or more embodiments disclosed herein.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306).

Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for validating recovery logs, comprising:
obtaining, by a validation manager of a backup storage, a first snapshot comprising a first plurality of data units;
making a first determination that the first snapshot is associated with synchronous validation;
in response to the first determination:
writing a first data unit of the first plurality of data units to a recovery log;
computing a new checksum associated with the first data unit;
comparing the new checksum with a previously generated checksum associated with the first data unit; and
making a second determination that the new checksum and the previously generated checksum match;
in response to the second determination:

generating a backup using the first plurality of data units;

obtaining a second snapshot comprising a second plurality of data units;

making a third determination that the first snapshot is associated with asynchronous validation;

in response to the third determination:

writing the second plurality of data units to the recovery log;

writing a copy of the second plurality of data units to a validation queue;

generating a barrier condition associated with the validation queue;

initiating performance of asynchronous validation using the barrier condition and the validation queue;

waiting completion of asynchronous validation; and making a fourth determination that the asynchronous validation is complete; and in response to the fourth determination:

generating a second backup using the second plurality of data units.

2. The method of claim 1, wherein the method further comprises:

after making the second determination and before generating the backup:

writing a second data unit of the first plurality of data units to the recovery log;

computing a second new checksum associated with the second data unit;

comparing the second new checksum with a second previously generated checksum associated with the second data unit;

making a fifth determination that the second new checksum and the second previously generated checksum do not match; and in response to the fifth determination:

performing recovery log remediation based on the second data unit.

3. The method of claim 1, wherein the first data unit comprises data of the first data unit and a previously generated checksum of the data of the first data unit.

4. The method of claim 3, wherein the previously generated checksum and the checksum are generated by applying the data of the first data unit to a cryptographic hash function.

5. The method of claim 1, wherein the barrier condition specifies a data unit in the validation queue after which the asynchronous validation associated with the second backup is complete.

6. The method of claim 1, wherein initiating the performance of asynchronous validation using the barrier condition and the validation queue comprises:

removing a third data unit of the second plurality of data units from the validation queue;

computing a third new checksum associated with the third data unit;

comparing the third new checksum with a third previously generated checksum associated with the third data unit;

making a fifth determination that the third new checksum and the third previously generated checksums match; and in response to making the fifth determination:

making a sixth determination that the barrier condition has not been reached.

7. The method of claim 6, further comprising:

in response to making the fifth determination:

removing a fourth data unit of the second plurality of data units from the validation queue;

computing a fourth new checksum associated with the fourth data unit;

comparing the fourth new checksum with a fourth previously generated checksum associated with the third data unit;

making a sixth determination that the fourth new checksum and the fourth previously generated checksums do not match; and in response to making the sixth determination:

performing recovery log remediation based on the fourth data unit.

8. The method of claim 7, further comprising:

making a seventh determination that the barrier condition is reached; and in response to the seventh determination:

completing the asynchronous validation.

9. A non-transitory computer readable medium comprising computer readable program code, which when executed by a computer processor enables the computer processor to perform a method for validating recovery logs, the method comprising:

obtaining, by a validation manager of a backup storage, a first snapshot comprising a first plurality of data units;

making a first determination that the first snapshot is associated with synchronous validation;

in response to the first determination:

writing a first data unit of the first plurality of data units to a recovery log;

computing a new checksum associated with the first data unit;

comparing the new checksum with a previously generated checksum associated with the first data unit; and making a second determination that the new checksum and the previously generated checksum match;

in response to the second determination:

generating a backup using the first plurality of data units;

obtaining a second snapshot comprising a second plurality of data units;

making a third determination that the first snapshot is associated with asynchronous validation;

in response to the third determination:

writing the second plurality of data units to the recovery log;

writing a copy of the second plurality of data units to a validation queue;

generating a barrier condition associated with the validation queue;

initiating performance of asynchronous validation using the barrier condition and the validation queue;

waiting completion of asynchronous validation; and making a fourth determination that the asynchronous validation is complete; and in response to the fourth determination:

generating a second backup using the second plurality of data units.

10. The non-transitory computer readable medium of claim 9, wherein the method further comprises:

after making the second determination and before generating the backup:

writing a second data unit of the first plurality of data units to the recovery log;

computing a second new checksum associated with the second data unit;

comparing the second new checksum with a second previously generated checksum associated with the second data unit;

making a fifth determination that the second new checksum and the second previously generated checksum do not match; and in response to the third determination:

performing recovery log remediation based on the second data unit.

11. The non-transitory computer readable medium of claim 9, wherein the first data unit comprises data of the first data unit and a previously generated checksum of the data of the first data unit.

12. The non-transitory computer readable medium of claim 11, wherein the previously generated checksum and the checksum are generated by applying the data of the first data unit to a cryptographic hash function.

13. The non-transitory computer readable medium of claim 9, wherein the barrier condition specifies a data unit in the validation queue after which the asynchronous validation associated with the second backup is complete.

14. The non-transitory computer readable medium of claim 9, wherein initiating the performance of asynchronous validation using the barrier condition and the validation queue comprises:

removing a third data unit of the second plurality of data units from the validation queue;

computing a third new checksum associated with the third data unit;

comparing the third new checksum with a third previously generated checksum associated with the third data unit;

making a fifth determination that the third new checksum and the third previously generated checksums match; and in response to making the fifth determination:

making a sixth determination that the barrier condition has not been reached.

15. The non-transitory computer readable medium of claim 14, further comprising:

in response to making the fifth determination:

removing a fourth data unit of the second plurality of data units from the validation queue;

computing a fourth new checksum associated with the fourth data unit;

comparing the fourth new checksum with a fourth previously generated checksum associated with the third data unit;

making a sixth determination that the fourth new checksum and the fourth previously generated checksums do not match; and in response to making the sixth determination:

performing recovery log remediation based on the fourth data unit.

16. The non-transitory computer readable medium of claim 15, further comprising:

making a seventh determination that the barrier condition is reached; and in response to the seventh determination:

completing the asynchronous validation.

17. A system for validating recovery logs, the system comprising:

a client comprising file system data; and a backup storage, comprising a processor and memory, wherein the backup storage is configured to perform a method comprising:

obtaining, by a validation manager of the backup storage, a first snapshot comprising a first plurality of data units;

making a first determination that the first snapshot is associated with synchronous validation;

in response to the first determination:

writing a first data unit of the first plurality of data units to a recovery log;

computing a new checksum associated with the first data unit;

comparing the new checksum with a previously generated checksum associated with the first data unit; and making a second determination that the new checksum and the previously generated checksum match;

in response to the second determination:

generating a backup using the first plurality of data units;

obtaining a second snapshot comprising a second plurality of data units;

making a third determination that the first snapshot is associated with asynchronous validation;

in response to the third determination:

writing the second plurality of data units to the recovery log;

writing a copy of the second plurality of data units to a validation queue;

generating a barrier condition associated with the validation queue;

initiating performance of asynchronous validation using the barrier condition and the validation queue;

waiting completion of asynchronous validation; and making a fourth determination that the asynchronous validation is complete; and in response to the fourth determination:

generating a second backup using the second plurality of data units.

18. The system of claim 17, wherein the method further comprises:

after making the second determination and before generating the backup:

writing a second data unit of the first plurality of data units to the recovery log;

computing a second new checksum associated with the second data unit;

comparing the second new checksum with a second previously generated checksum associated with the second data unit;

making a fifth determination that the second new checksum and the second previously generated checksum do not match; and in response to the fifth determination:

performing recovery log remediation based on the second data unit.

\* \* \* \* \*